United States Patent
Dain et al.

(10) Patent No.: US 10,691,349 B2
(45) Date of Patent: Jun. 23, 2020

(54) MITIGATING DATA LOSS

(71) Applicant: International Business Machines Corporation, Armonk, NY (US)

(72) Inventors: Joseph W. Dain, Vail, AZ (US); Itzhack Goldberg, Hadera (IL); Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/337,366

(22) Filed: Oct. 28, 2016

(65) Prior Publication Data

US 2018/0121108 A1    May 3, 2018

(51) Int. Cl.
   *G06F 3/06* (2006.01)
(52) U.S. Cl.
   CPC .......... *G06F 3/0619* (2013.01); *G06F 3/0641* (2013.01); *G06F 3/0653* (2013.01); *G06F 3/0673* (2013.01)
(58) Field of Classification Search
   None
   See application file for complete search history.

(56) References Cited

U.S. PATENT DOCUMENTS

| | | | |
|---|---|---|---|
| 7,567,188 B1 | 7/2009 | Anglin et al. | |
| 8,290,915 B2 | 10/2012 | Anglin | |
| 8,463,757 B2 | 6/2013 | Wideman et al. | |
| 8,712,976 B1* | 4/2014 | Chen | G06F 17/30156 707/692 |
| 8,977,860 B2 | 3/2015 | Barrus et al. | |
| 9,104,622 B2 | 8/2015 | Anglin | |
| 9,152,502 B2 | 10/2015 | Kalach et al. | |
| 2009/0132619 A1* | 5/2009 | Arakawa | G06F 3/0605 |
| 2011/0055471 A1 | 3/2011 | Thatcher et al. | |
| 2014/0188805 A1 | 7/2014 | Vijayan | |
| 2015/0012503 A1 | 1/2015 | Akirav et al. | |
| 2016/0019148 A1 | 1/2016 | Vekiarides et al. | |
| 2016/0092137 A1 | 3/2016 | Doerk et al. | |

OTHER PUBLICATIONS

Nam et al., "Reliability-Aware Deduplication Storage: Assuring Chunk Reliability and Chunk Loss Severity", 978-1-4577-1221-0/11/, © 2011 IEEE, 6 pages.

(Continued)

*Primary Examiner* — Charles J Choi
(74) *Attorney, Agent, or Firm* — Monchai Chuaychoo

(57) ABSTRACT

A method, executed by a computer, includes writing, to a storage device, a first instance of a data sequence and a corresponding first reference count, in response to determining that a subsequent data sequence is identical to the first instance of the data sequence, writing, to the storage device, a metadata reference referencing the subsequent data sequence and incrementing the first reference count, and writing, to a storage device, a second instance of the data sequence and a corresponding second reference count in response to determining that the first reference count is equal to a selected threshold. A computer system and computer program product corresponding to the above method are also disclosed herein.

18 Claims, 4 Drawing Sheets

(56) References Cited

OTHER PUBLICATIONS

Rozier et al., "Modeling the Fault Tolerance Consequences of Deduplication", printed on Aug. 31, 2016, 10 pages.

Zhao et al., "Liquid: A Scalable Deduplication File System for Virtual Machine Images", IEEE Transactions on Parallel and Distributed Systems, Digital Object Indentifier 10.1109/TPDS.2013.173, © 2013 IEEE, 11 pages.

"EMC Data Domain Data Invulnerabiity Architecture: Enhancing Data Integrity and Recoverability", White Paper, A Detailed Review, May 2014, EMC2, 10 pages.

* cited by examiner

MITIGATING DATA LOSS

BACKGROUND OF THE INVENTION

The present invention relates generally to mitigating data loss, and more specifically, to mitigating data loss while employing data deduplication techniques.

In the field of deduplication, duplicates of data sequences are removed for various reasons, such as to increase available space in storage. However, if a deduplication process removes all duplicates of a data sequence, then the data sequence is much more vulnerable to a data loss event, as there is only one remaining copy of the sequence. Thus, it is important to strike a balance between deduplication and redundancy.

SUMMARY

As disclosed herein, a method, executed by a computer, includes writing, to a storage device, a first instance of a data sequence and a corresponding first reference count, in response to determining that a subsequent data sequence is identical to the first instance of the data sequence, writing, to the storage device, a metadata reference referencing the subsequent data sequence and incrementing the first reference count, and writing, to a storage device, a second instance of the data sequence and a corresponding second reference count in response to determining that the first reference count is equal to a selected threshold. A computer system and computer program product corresponding to the above method are also disclosed herein.

DETAILED DESCRIPTION

Embodiments of the present invention relate generally to mitigating data loss, and more specifically, to mitigating data loss while employing data deduplication techniques. Data deduplication refers to removing duplicates of a data sequence from a particular storage medium. Often, data deduplication is performed in order to increase free storage space on a storage medium. Embodiments of the present invention use deduplication in combination with a resiliency mechanism in order to deduplicate while also mitigating potential data loss.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
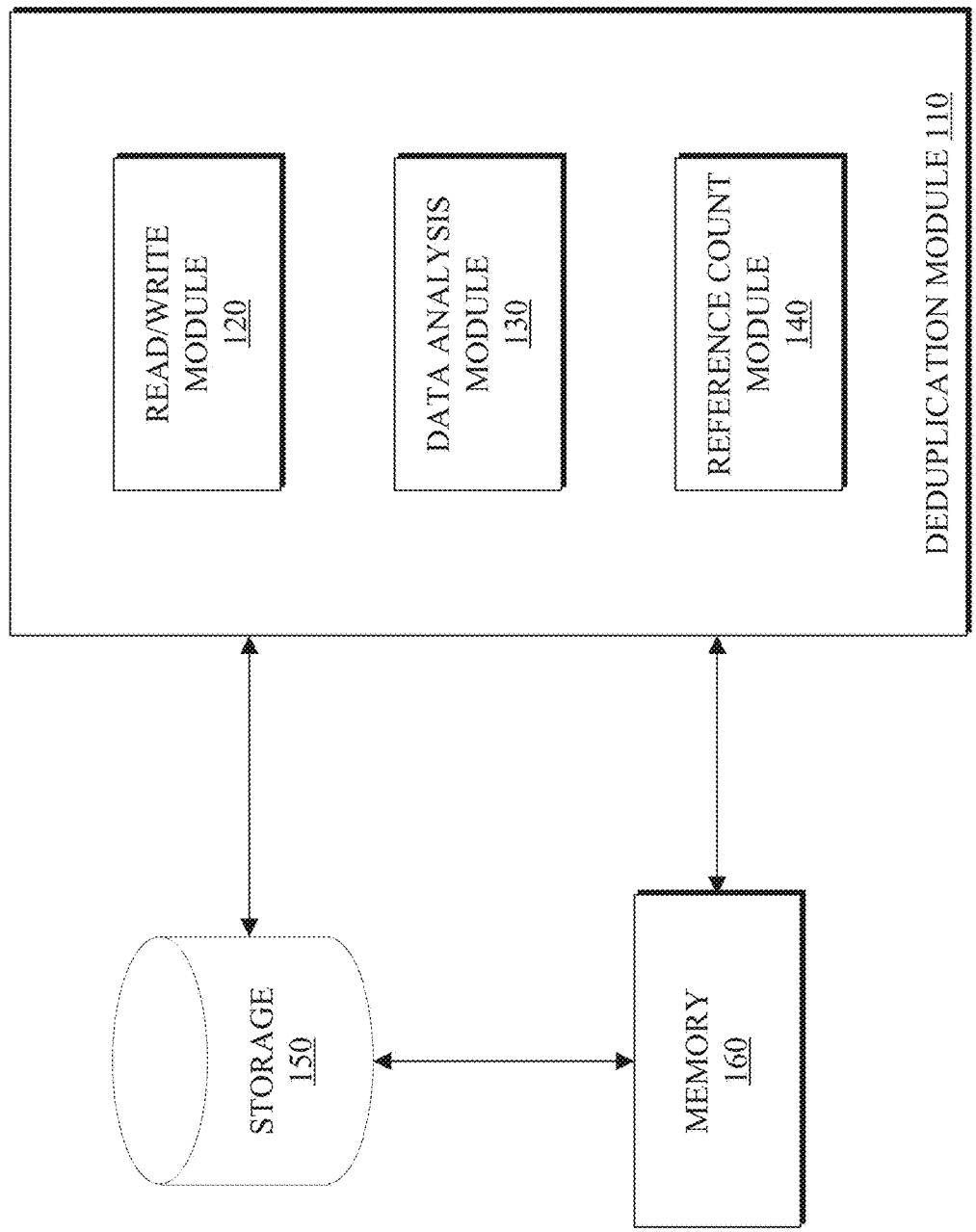
FIG. 1 is a block diagram depicting an example of a deduplication system in accordance with embodiments of the present invention.

FIG. 1 is a block diagram depicting an example of a deduplication system 100 in accordance with embodiments of the present invention. As depicted, deduplication system 100 includes deduplication module 110 with read/write module 120, data analysis module 130, and reference count module 140, as well as storage medium 150 and memory module 160. One deduplication module 110 may provide deduplication to one or multiple storage media 150 and/or memory modules 160.

Deduplication module 110 may refer to a logical grouping of read/write module 120, data analysis module 130, and reference count module 140. These various modules may function as a single unit (e.g., deduplication module 110 as depicted), or may be spread across multiple computers, servers, etc. In some embodiments, deduplication module 110 and its modules interface with storage medium 150 or memory module 160 in order to perform the aspects of the deduplication operations discussed herein.

Read/write module 120 may read from, or write to, storage medium 150 or memory module 160. In some embodiments, read/write module 120 is responsible for handling all read and write operations performed on storage medium 150 or memory module 160; in other embodiments, read/write module 120 only handles the read or write operations pertaining to deduplication module 110 or deduplication operations. Read/write module 120 may read from or write to storage medium 150 or memory module 160 directly, or may communicate read/write instructions to storage medium 150 or memory module 160.

Data analysis module 130 may analyze data from storage medium 150 and/or memory module 160. In particular, data analysis module 130 may search for duplicates of a given data sequence. For example, data analysis module 130 may compare chunks of data against a stored data sequence in order to find duplicates. In some embodiments, data analysis module 130 receives data from storage medium 150 or memory module 160 via read/write module 120 and searches the data for duplicates. When data analysis module 130 finds a duplicate, it may communicate the discovery to read/write module 120. In some embodiments, data analysis module 130 informs read/write module 120 when a duplicate is detected, and read/write module 120 removes the duplicate via a write operation. Read/write module 130 may also replace the removed duplicate with a metadata reference.

Reference count module 140 may count the number of times a duplicate of a particular data sequence is removed. Thus, for any given data sequence, reference count module 140 keeps track of the number of times that a duplicate sequence is removed and replaced with a placeholder metadata reference. For example, if there are ten identical copies of a data sequence, and nine are deduplicated, then the single remaining data sequence may be referenced nine times (i.e. it has a reference count of nine). Each time a duplicate is removed, reference count module 140 may respond by incrementing the reference count corresponding to the data sequence to which the duplicate's metadata reference refers. Reference count module 140 may also compare a data sequence's reference count against a threshold, and if the reference count is greater than (or in other embodiments, equal to) the threshold, then reference count module 140 may prevent deduplication of the sequence at that time.

Storage medium 150 may include any non-volatile storage media known in the art. For example, storage medium 150 may be implemented with a tape library, optical library, one or more independent hard disk drives, or multiple hard disk drives in a redundant array of independent disks (RAID). Similarly, data on storage medium 150 may conform to any suitable storage architecture known in the art, such as a file, a relational database, an object-oriented database, and/or one or more tables. Memory module 160 may include any primary storage. In some embodiments, memory module 160 stores data that is queued to be written to storage medium 150, or data that has recently been read from storage medium 150. Read/write module 120 and memory module 160 may function in tandem to read from or write to storage medium 150. Deduplication module 110 may discover duplicate sequences in storage medium 150, memory module 160, or both.

Figure 2A:
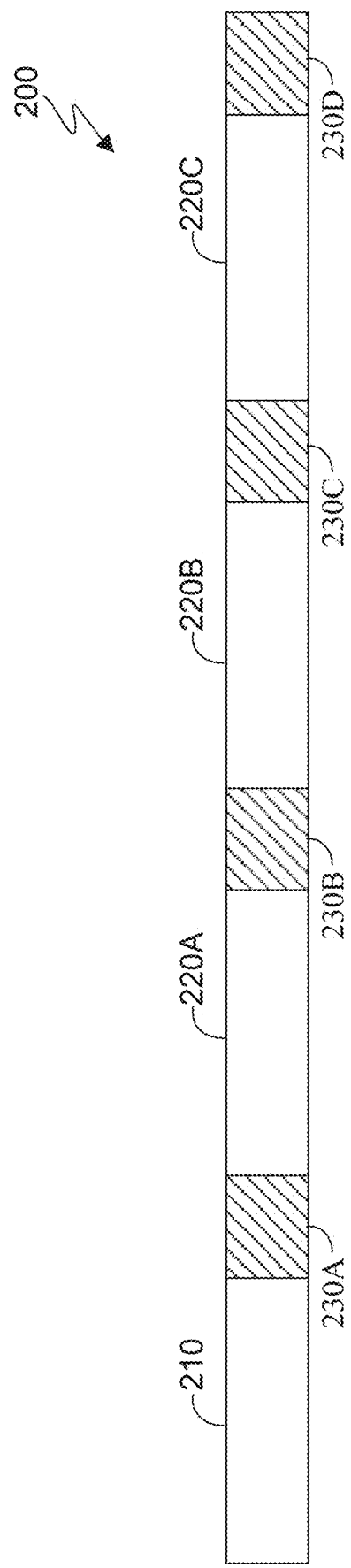
FIGS. 2A and 2B are diagrams depicting examples of a data storage segment in accordance with embodiments of the present invention.
Figure 2B:
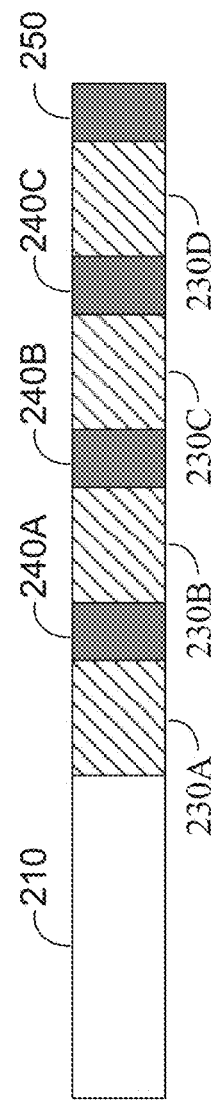

FIGS. 2A and 2B are diagrams depicting examples of a data storage segment 200 in accordance with embodiments of the present invention. As depicted, data storage segment 200 includes data sequence 210, duplicate sequences 220A-220C, intervening data 230A-230D, and metadata references 240A-240C and 250. Data storage segment 200 represents stored data on a portion of a storage medium, such as storage 150. For example, data storage segment 200 may be a representation of all or part of a range of a logical disk; data storage segment 200 may be contained to one storage medium or may span multiple storage media.

Data sequence 210 may include any sequence of data stored in data storage segment 200. Duplicate sequences 220A-220C include any other sequences in data storage segment 200 that are duplicates of data sequence 210. Thus, it is arbitrary to designate one as data sequence 210 and the others as duplicate sequences 220A-220C as all four sequences are identical. However, when performing deduplication operations, at least one copy of a data sequence must be designated as data sequence 210 in order for other sequences to be deduplicated.

Intervening data 230A-230D may represent other data in data storage segment 200 that does not contain duplicates of data sequence 210. There may not be intervening data between each duplicate sequence 220A-220C; it is possible that a series of duplicates sequences repeat sequentially in data storage segment 200, or that some duplicate sequences immediately follow each other, and other duplicate sequences do not.

In FIG. 2B, metadata references 240A-240C have replaced duplicate sequences 220A-220C. Each metadata reference may refer to a data sequence, such as data sequence 210. Thus, as depicted, metadata references 240A-240C correspond to duplicate sequences 220A-220C, respectively. In some embodiments, read/write module 120 replaces duplicate sequences with metadata references during deduplication. A metadata reference may occupy a small amount of storage as each metadata reference refers to the location of data sequence 210 in storage. Thus, while an instance of a data sequence and its duplicates such as data sequence 210 and duplicate sequences 220A-220C may be of some arbitrary length, by replacing duplicate sequences with metadata references, the overall amount of storage occupied by data storage segment 200 may be reduced. Although metadata references 240A-240C are depicted in the same relative locations as the duplicate sequences 220A-220C which they replace, metadata references 240A-240C may appear in any free space in storage.

Metadata reference 250 may include a metadata reference that refers to data sequence 210. In some embodiments, data sequence 210 is accounted for as a metadata reference 250, which, along with metadata references 240A-240C, each contribute to an incrementation of the reference count for data sequence 210. Metadata reference 250 may not be present in some embodiments, as data sequence 210 may represent itself without the need for a metadata reference.

Figure 3:
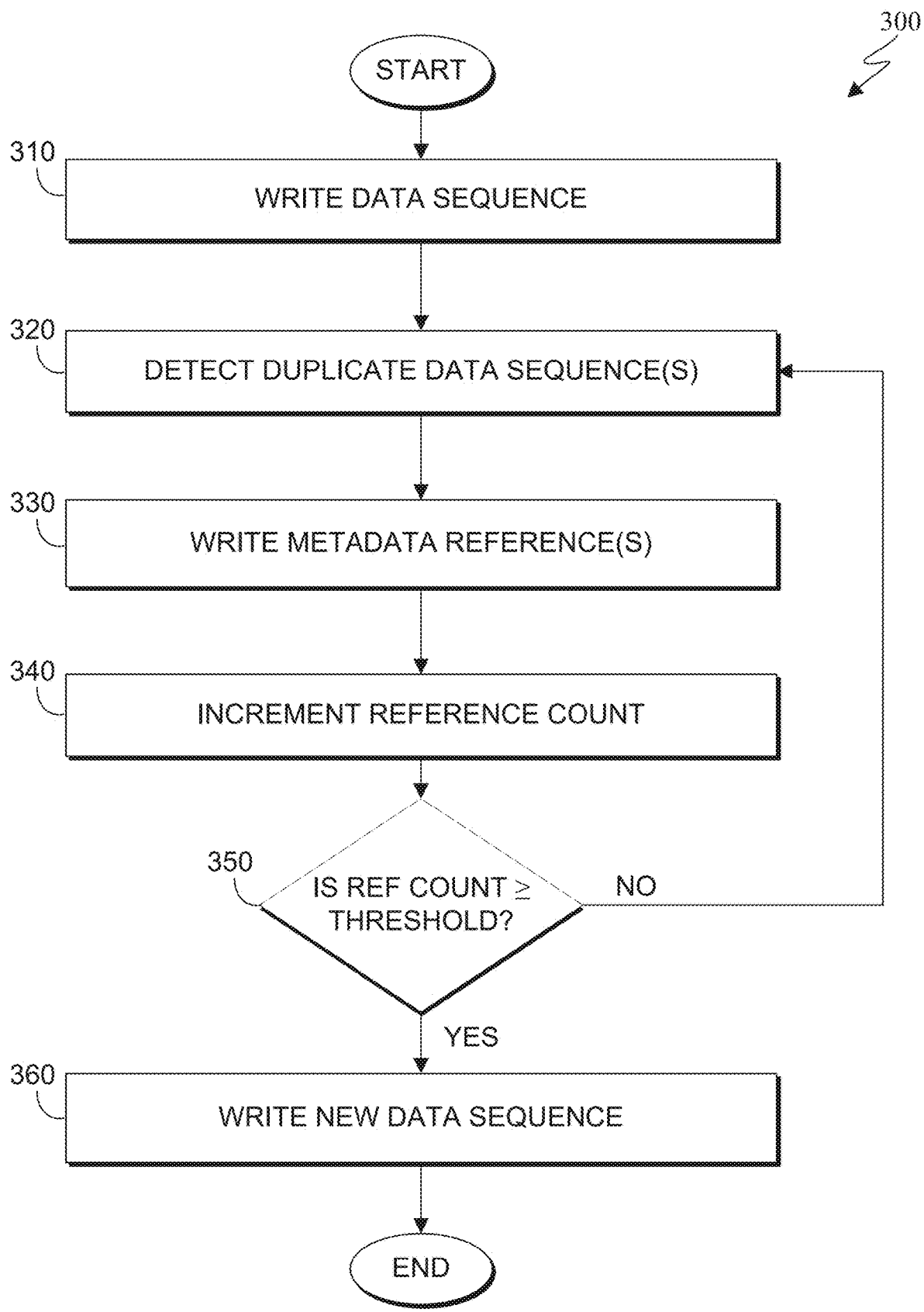
FIG. 3 is a flow chart depicting an example of a deduplication method in accordance with embodiments of the present invention.

FIG. 3 is a flow chart depicting an example of a deduplication method 300 in accordance with embodiments of the present invention. As depicted, deduplication method 300 includes writing (310) a data sequence, detecting (320) identical data sequence(s), writing (330) metadata reference(s), incrementing (340) a reference count, determining (350) whether the reference count is greater than a threshold, and writing (360) a new data sequence. Deduplication method 300 may perform deduplication operations on data previously-written to a storage device, or may execute on-the-fly as data is written, or a combination of the two. Deduplication method 300 may be executed on deduplication system 100 and/or computer 400.

Writing (310) a data sequence may include writing a first instance of a data sequence. Subsequent copies of this data sequence may be treated as duplicates. In some embodiments, the data sequence is data sequence 210 written to storage medium 150.

Detecting (320) duplicate data sequence(s) may include detecting one or more data sequences that are identical to the first instance of the data sequence. In some embodiments, the duplicate sequences, such as duplicate sequences 220A-220C, are detected by data analysis module 130. Duplicate data sequences may be located on storage medium 150, or may be in memory module 160 and about to be written to storage medium 150.

Writing (330) metadata reference(s) may include writing a metadata reference corresponding to each duplicate sequence, and deleting (or marking for deletion) the duplicate sequences. In some embodiments, each metadata reference is written over the duplicate sequence to which it refers, and any excess space not occupied by the metadata reference is marked as free storage space. In other embodiments, metadata references are written to any space in storage medium 150 that is available.

Incrementing (340) a reference count may include incrementing the count for each metadata reference that refers to the first instance of the data sequence. The reference count may be stored in metadata references or may be associated with data sequence 210. In some embodiments, the reference count is maintained by deduplication module 110. As multiple instances of the same data sequence are created, each instance receives its own reference count.

Determining (350) whether the reference count is equal to or greater than a threshold may include comparing the reference count to a predefined threshold representing a maximum reference count. As long as the reference count is less than or equal to the threshold, then the method may loop through operations 320-340 until the reference count is equal to the maximum reference count. Once the reference count exceeds the threshold, deduplication method 300 proceeds to operation 360. In this manner, no single instance of a data sequence may be referenced too many times. In some embodiments, the threshold may be provided by a user. The threshold may be set to a number less than or equal to the deduplication ratio corresponding to a storage device. Users may dynamically change the maximum reference count on-the-fly.

Writing (360) a new data sequence may include writing a new instance of the data sequence being deduplicated. A similar result may also be achieved by not deduplicating the next duplicate instance in a series of duplicates, and writing additional metadata references such that they refer to the new data sequence. As deduplication method 300 repeats, this new data sequence becomes the original data sequence in operation 310. Thus, deduplication method 300 may repeat to create a new instance of the data reference every time the previous instance has reached the maximum number of metadata references (i.e. the threshold).

For example, if deduplication method 300 is performed on a storage medium having many duplicates of a data sequence and a maximum reference count of four, the first instance of the data will be treated as a reference instance and kept, and the next four may be replaced with metadata references. At this point, the determining operation 350 will determine that the threshold is met, and keep the next duplicate sequence as a new instance of the data sequence. After deduplicating four more duplicates, the threshold is again met, and yet another duplicate is kept as a new instance of the same sequence, rather than replaced with a metadata reference. Thus, if a few instances of the data sequence are lost in a data sequence, the data sequence is not lost in entirety as other instances of the data sequence exist.

Deduplication method 300 can be performed as a background task on storage in this manner, or deduplication method 300 may be performed on-the-fly as data is written to storage media. In some embodiments, these instances of the same data sequence are placed across disk failure groups so that a single failure will not lead to data loss of all instances being referenced. A background task may clean up any over-referenced instances of data sequences and remove the associated duplicates, such as those created by error recovery. When duplicate sequences are removed or deleted, their corresponding instance count may be decremented. In some embodiments, a background task may relocate data instances across new failure group boundaries following the failure and subsequent replacement of a failure group.

Recovery of data upon which deduplication method 300 has been run may proceed as follows: when an access failure is detected, an alternate instance of the data sequence may be used. At that time, all of the metadata references referring to the unreadable instance may be instead pointed to a readable instance, or a new instance may be written.

Alternatively, a second recovery process may proceed by a deduplication system that manages the storage, such as deduplication module 110. In this case, higher-level objects, such as virtual tapes, may have mechanisms to test data integrity (e.g., a record checksum). If a data sequence cannot be read and the checksum verified, the sequence may be re-read using as many alternate instances of the data sequence as possible. Each data sequence and metadata reference pair may be provided with a potential error counter that is reset whenever a good read operation occurs, and is incremented whenever the operation fails. A threshold may then be used to select bad instances and replace them (or point their metadata references to another instance as in the first recovery process). This second recovery process may occur in the background or as a foreground task so that an end-user may verify whether the data is good or not; if the user that the data is bad, then deduplication system 100 may take the same actions as previously described in the data first recovery process.

Figure 4:
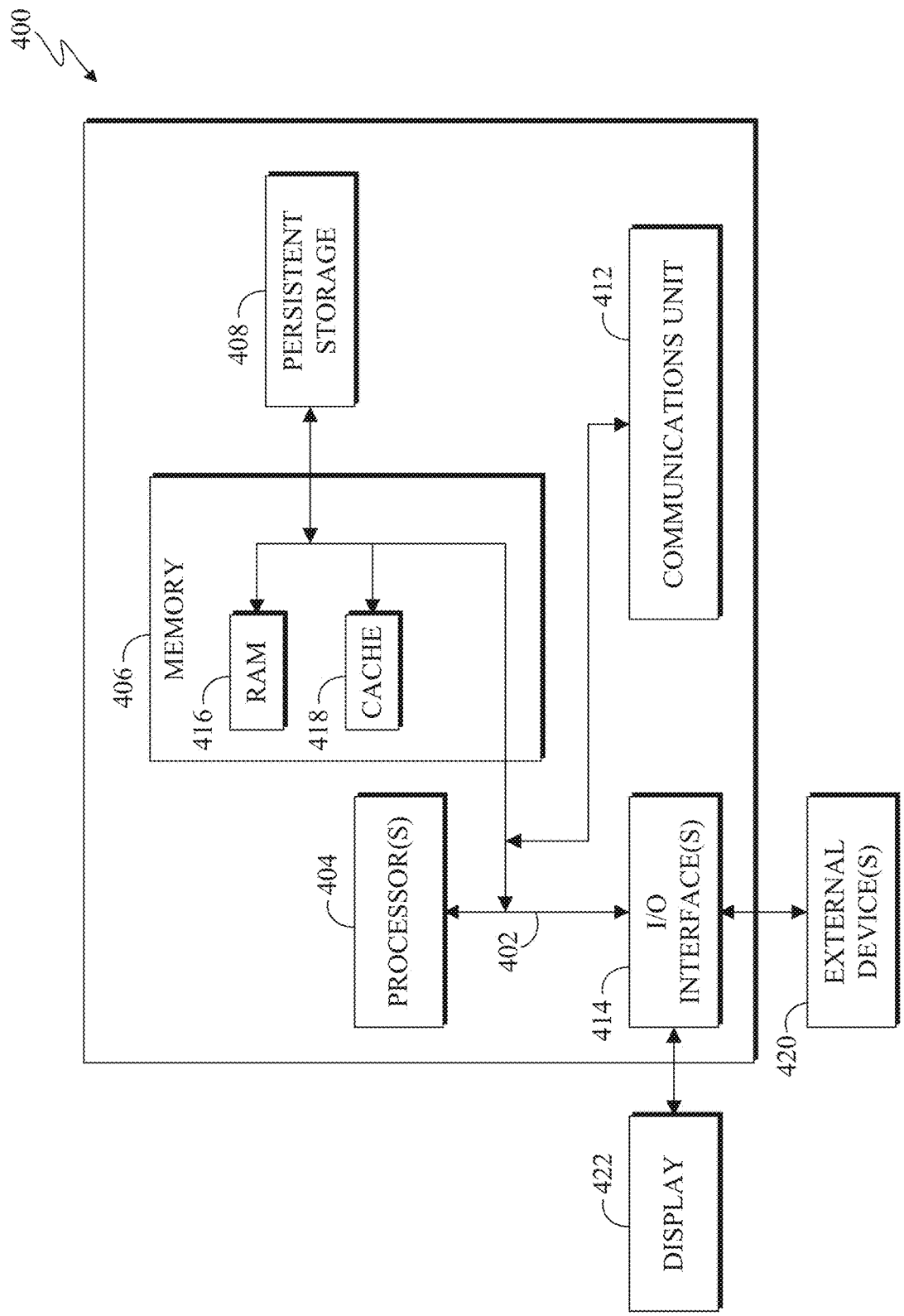
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of mitigating data loss during data deduplication, the method comprising:
writing, to a one or more disk failure group associated with a storage device, a first instance of a data sequence and a corresponding first reference count,
in response to determining that a subsequent data sequence is identical to the first instance of the data sequence,
writing, to the storage device, a metadata reference referencing the subsequent data sequence, and
incrementing the first reference count; and
writing, to a different of the one or more disk failure group associated with the storage device, a second instance of the data sequence and a corresponding second reference count in response to determining that the first reference count is equal to a selected threshold, wherein the threshold can be dynamically adjusted by a user and the second instance of the data sequence is written sequentially, wherein the storage device of the first instance and the second instance immediately follows each other in the one or more disk failure group.

2. The method of claim 1, wherein writing the first instance of the data sequence further comprises writing a first metadata reference that refers to the first instance of the data sequence.

3. The method of claim 1, wherein the subsequent data sequence is located in memory.

4. The method of claim 1, wherein the subsequent data sequence is located on the storage device.

5. The method of claim 1, wherein the selected threshold is equal to or less than a deduplication ratio corresponding to the storage device.

6. The method of claim 1, wherein the selected threshold is determined according to user input.

7. A computer system comprising:
one or more computer processors;
one or more computer readable storage media;
program instructions stored therein for execution by at least one of the one or more computer processors, the program instructions comprising instructions for:
writing, to a one or more disk failure group associated with a storage device, a first instance of a data sequence and a corresponding first reference count;
in response to determining that a subsequent data sequence is identical to the first instance of the data sequence,
writing, to the storage device, a metadata reference referencing the subsequent data sequence, and
incrementing the first reference count; and
writing, to a different of the one or more disk failure group associated with the storage device, a second instance of the data sequence and a corresponding second reference count in response to determining that the first reference count is equal to a selected threshold, wherein the threshold can be dynamically adjusted by a user and the second instance of the data sequence is written sequentially, wherein the storage device of the first instance and the second instance immediately follows each other in the one or more disk failure group.

8. The computer system of claim 7, wherein instructions for writing the first instance of the data sequence further comprise instructions for writing a first metadata reference that refers to the first instance of the data sequence.

9. The computer system of claim 7, wherein the subsequent data sequence is located in memory.

10. The computer system of claim 7, wherein the subsequent data sequence is located on the storage device.

11. The computer system of claim 7, wherein the selected threshold is equal to or less than a deduplication ratio corresponding to the storage device.

12. The computer system of claim 7, wherein the selected threshold is determined according to user input.

13. A computer program product comprising:
a non-transitory computer readable storage medium and program instructions stored on the non-transitory computer readable storage medium, the program instructions comprising instructions for:
writing, to a one or more disk failure group associated with a storage device, a first instance of a data sequence and a corresponding first reference count;
in response to determining that a subsequent data sequence is identical to the first instance of the data sequence,
writing, to a different of the one or more disk failure group associated with the storage device, a metadata reference referencing the subsequent data sequence, and
incrementing the first reference count; and
writing, to the storage device, a second instance of the data sequence and a corresponding second reference count in response to determining that the first reference count is equal to a selected threshold, wherein the threshold can be dynamically adjusted by a user and the second instance of the data sequence is written sequentially, wherein the storage device of the first instance and the second instance immediately follows each in the one or more disk failure group.

14. The computer program product of claim 13, wherein the instructions for writing the first instance of the data sequence further comprise instructions for writing a first metadata reference that refers to the first instance of the data sequence.

15. The computer program product of claim 13, wherein the subsequent data sequence is located in memory.

16. The computer program product of claim 13, wherein the subsequent data sequence is located on the storage device.

17. The computer program product of claim 13, wherein the selected threshold is equal to or less than a deduplication ratio corresponding to the storage device.

18. The computer program product of claim 13, wherein the selected threshold is determined according to user input.

* * * * *